(12) United States Patent
Lee et al.

(10) Patent No.: US 11,995,798 B2
(45) Date of Patent: May 28, 2024

(54) ELECTRONIC DEVICE AND METHOD FOR MANAGING NON-DESTRUCTIVE EDITING CONTENTS

(71) Applicant: Samsung Electronics Co., Ltd., Suwon-si (KR)

(72) Inventors: Joohyung Lee, Suwon-si (KR); Byounggeun Choi, Suwon-si (KR); Changhoon Kang, Suwon-si (KR); Junsang You, Suwon-si (KR); Changmin Lee, Suwon-si (KR); Younghun Joo, Suwon-si (KR); Jaeho Choi, Suwon-si (KR); Hyoungho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 17/439,146

(22) PCT Filed: Aug. 24, 2021

(86) PCT No.: PCT/KR2021/011270
§ 371 (c)(1),
(2) Date: Sep. 14, 2021

(87) PCT Pub. No.: WO2022/065704
PCT Pub. Date: Mar. 31, 2022

(65) Prior Publication Data
US 2022/0309614 A1 Sep. 29, 2022

(30) Foreign Application Priority Data
Sep. 25, 2020 (KR) .................. 10-2020-0124525

(51) Int. Cl.
*G06T 5/00* (2024.01)
*G06F 21/60* (2013.01)
*G06T 5/50* (2006.01)

(52) U.S. Cl.
CPC .............. *G06T 5/00* (2013.01); *G06F 21/602* (2013.01); *G06T 5/50* (2013.01); *G06F 2221/2141* (2013.01); *G06T 2207/20224* (2013.01)

(58) Field of Classification Search
CPC . G06T 5/001; G06T 5/50; G06T 2207/20224; G06T 5/00; G06F 21/602;
(Continued)

(56) References Cited

U.S. PATENT DOCUMENTS 9,501,684 B1 11/2016 Krishnaswamy et al.
9,870,796 B2 * 1/2018 Goldberg ............. G11B 27/031
(Continued)

FOREIGN PATENT DOCUMENTS

KR 10-2009-0038004 A 4/2009
KR 10-2011-0054196 A 5/2011
(Continued)

OTHER PUBLICATIONS

International Search Report and written opinion dated Nov. 22, 2021, issued in International Application No. PCT/KR2021/011270.
(Continued)

*Primary Examiner* — Luong T Nguyen
(74) *Attorney, Agent, or Firm* — Jefferson IP Law, LLP

(57) ABSTRACT

A method and a device are provided. The device includes a camera module, a communication module, a memory, and a processor operatively coupled to the camera module, the communication module, and the memory, wherein the processor is configured to acquire a first content through the camera module or the communication module, generate a
(Continued)

second content by editing the first content, based on a user input, store the acquired first content in a secure area of the memory, and store the second content including metadata corresponding to the second content and first content access information corresponding to the first content in a general area of the memory, and the first content access information associates the first content with the second content.

16 Claims, 10 Drawing Sheets

(58) Field of Classification Search
CPC ............ G06F 2221/2141; G06F 21/60; H04N 21/4223; H04N 21/4334; H04N 9/8205; H04N 5/77; H04N 5/907; H04N 5/9201
See application file for complete search history.

(56) References Cited

U.S. PATENT DOCUMENTS

| | | | |
|---|---|---|---|
| 10,276,209 B2 | 4/2019 | Cho et al. | |
| 2007/0299888 A1 | 12/2007 | Thornton et al. | |
| 2008/0143742 A1 | 6/2008 | Jeong et al. | |
| 2009/0310930 A1 | 12/2009 | Morimoto et al. | |
| 2014/0032865 A1 | 1/2014 | Nagai et al. | |
| 2015/0082172 A1* | 3/2015 | Shakib | G06F 16/48 715/731 |
| 2015/0095483 A1 | 4/2015 | Muramoto et al. | |
| 2015/0242315 A1 | 8/2015 | Czerkowicz et al. | |
| 2015/0278165 A1* | 10/2015 | Kim | G06F 40/106 715/252 |
| 2016/0202841 A1* | 7/2016 | Christiansson | G06F 3/0421 345/175 |
| 2019/0377901 A1 | 12/2019 | Balzer et al. | |
| 2021/0055874 A1 | 2/2021 | Mok et al. | |

FOREIGN PATENT DOCUMENTS

| | | | |
|---|---|---|---|
| KR | 10-1310253 B1 | | 9/2013 |
| KR | 101310253 B1 | * | 9/2013 |
| KR | 10-2014-0101222 A | | 8/2014 |
| KR | 10-2016-0087573 A | | 7/2016 |
| KR | 10-2019-0098514 A | | 8/2019 |
| KR | 20190098514 A | * | 8/2019 |
| WO | 2017/022386 A1 | | 2/2017 |

OTHER PUBLICATIONS

Extended European Search Report dated Nov. 20, 2023, issued in European Application No. 21872734.5-1218.

* cited by examiner

ELECTRONIC DEVICE AND METHOD FOR MANAGING NON-DESTRUCTIVE EDITING CONTENTS

CROSS-REFERENCE TO RELATED APPLICATION(S)

This application is a U.S. National Stage application under 35 U.S.C. § 371 of an International application number PCT/KR2021/011270, filed on Aug. 24, 2021, which is based on and claimed priority of a Korean patent application number 10-2020-0124525 filed on Sep. 25, 2020, in the Korean Intellectual Property Office, the disclosure of each of which is incorporated by reference herein in its entirety.

TECHNICAL FIELD

Various embodiments disclose a method and a device for managing contents, wherein original contents and edited contents are separately stored such that non-destructive editing is possible.

BACKGROUND ART

An electronic device may capture images (or pictures) by using a camera module, and may modify the captured images (or images to be captured) by using a filter or a sticker. When edited contents to which the modifying (or editing) effect has been applied are to be re-edited, it may only be possible to add new effects to the edited contents, and the already-applied editing effect may not be removed. The electronic device provides a function such that original contents (which have not been edited) can be separated stored and can be re-edited based on the original contents ("non-destructive editing function").

DISCLOSURE OF INVENTION

Technical Problem

Conventional electronic devices store original contents and modified contents so as to have 1:1 matching. For this reason, if edited contents based on original contents are newly generated, original contents corresponding to the generated edited contents may also be newly generated. Original contents increase in proportion to edited contents and thus may unnecessarily occupy a large proportion of the storage space of the electronic devices. In addition, conventional electronic devices allow users to access original contents, which may then be leaked to the outside or may be damaged.

Various embodiments may disclose a method and a device wherein original contents are stored in a secure area of a memory, and edited contents including metadata, which is an edited version of the original contents, and original content access information are stored in a general area of the memory.

Solution to Problem

An electronic device according to various embodiments may include: a camera module; a communication module; a memory; and a processor operatively coupled to the camera module, the communication module, and the memory, wherein the processor is configured to acquire a first content through the camera module or the communication module, generate a second content by editing the first content, based on a user input, and store the acquired first content in a secure area of the memory, and store the second content including metadata corresponding to the second content and first content access information corresponding to the first content in a general area of the memory, and wherein the first content access information associates the first content with the second content.

An operating method of an electronic device according to various embodiments may include: acquiring a first content through a camera module of the electronic device or a communication module of the electronic device; generating a second content by editing the first content, based on a user input; and storing the acquired first content in a secure area of a memory in the electronic device, and storing the second content including metadata corresponding to the second content and first content access information corresponding to the first content in a general area of the memory, wherein the first content access information associates the first content with the second content.

Advantageous Effects of Invention

According to various embodiments, one or more edited contents generated with reference to a single original content may be stored so as to match with the single original content, thereby minimizing the storage space occupied by images.

According to various embodiments, original contents may be stored in the secure area of a memory and managed such that the user cannot access the same, or such that the original contents can be accessed only by specific rights, thereby managing the original contents such that the same are not exposed to the outside, deleted, or deformed and damaged.

According to various embodiments, edited contents may be stored to be associated with original contents such that, if the original contents are missing or damaged, the edited contents may be used to restore (generate) the original contents. If the edited contents are missing or damaged, the original contents may be used to restore (generate) the original contents.

According to various embodiments, original contents may be stored in a server according to the user's choice such that, if the original contents are necessary, the same can be downloaded from the server and used.

According to various embodiments, original contents may be transmitted to another electronic device together with edited contents according to the user's choice such that the other electronic device can generate new edited contents by using the original contents, thereby facilitating non-destructive editing between different electronic devices.

According to various embodiments, metadata, which is an edited version of original contents, may be encrypted and stored, thereby protecting information regarding the edited contents.

MODE FOR CARRYING OUT THE INVENTION

Figure 1:
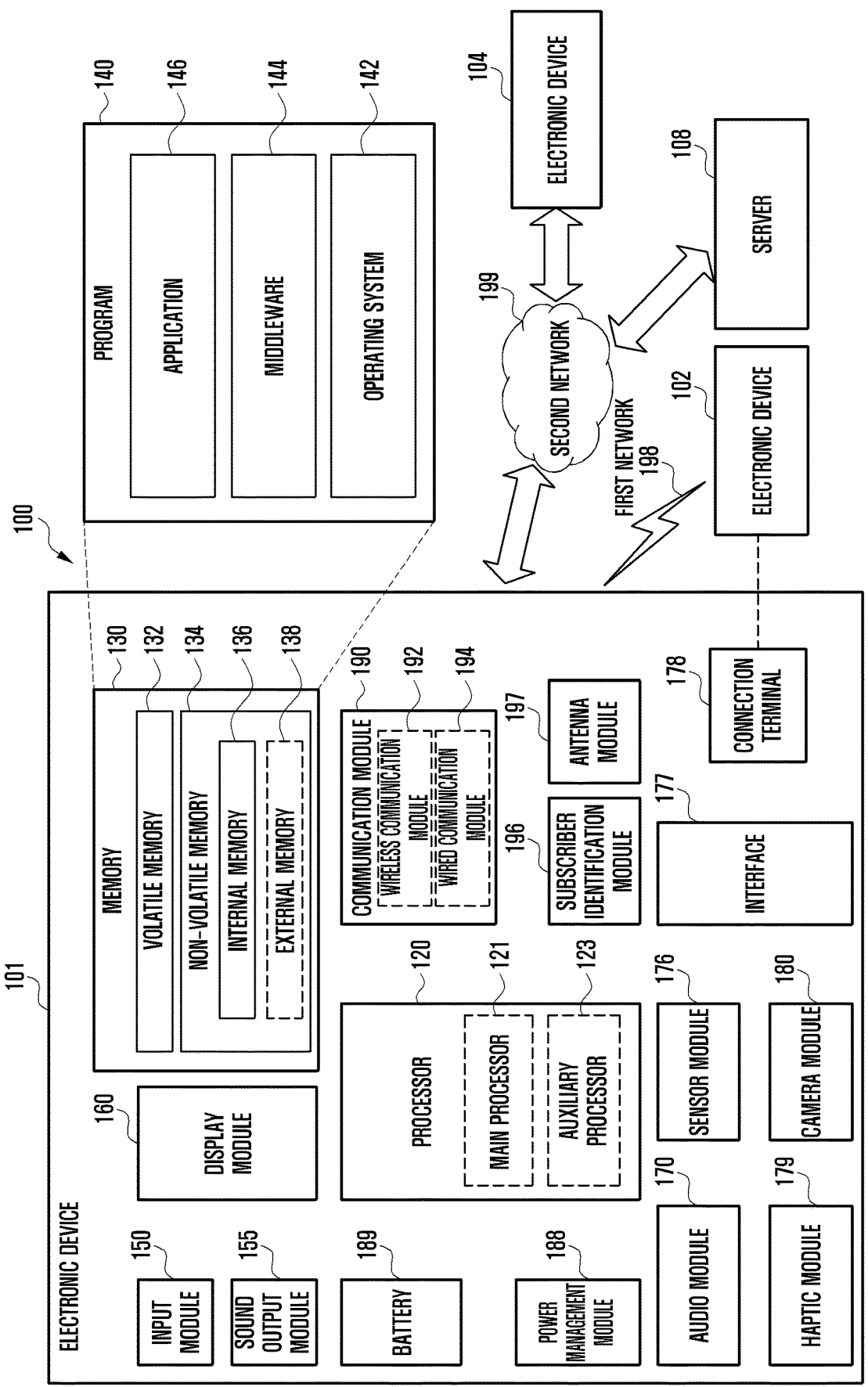
FIG. 1 is a block diagram of an electronic device in a network environment according to various embodiments.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device in a network environment 100 according to an embodiment of the disclosure.

Referring to FIG. 1, an electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting (or connection) terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Certain embodiments as set forth herein may be implemented as software (e.g., the program 140) including one or more instructions that are stored in a non-transitory storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
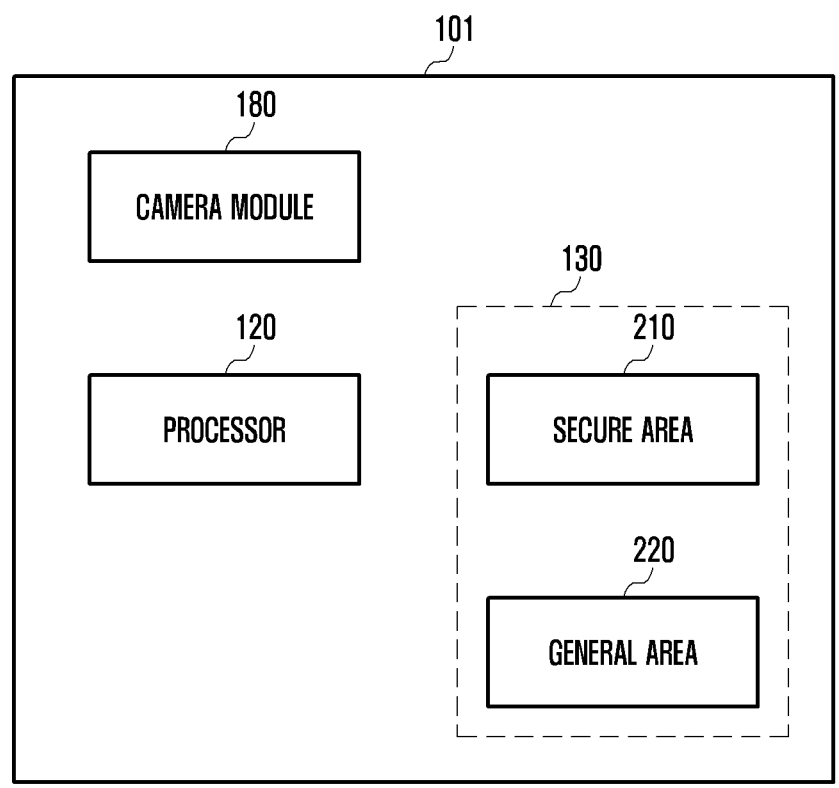
FIG. 2 illustrates components included in an electronic device according to various embodiments.

FIG. 2 illustrates components included in an electronic device according to an embodiment of the disclosure.

Referring to FIG. 2, an electronic device (e.g., the electronic device 101 of FIG. 1) according to various embodiments may include a processor (e.g., the processor 120 of FIG. 1), a camera module (e.g., the camera module 180 of FIG. 1), and a memory (e.g., the memory 130 of FIG. 1). The memory 130 may be divided into a secure area 210 and a general area 220. The secure area 210 may correspond to a separately hidden storage space. The secure area 210 may be a storage space physically or logically separated from the general area 220.

The processor 120 may store an original content in the secure area 210 of the memory 130, and store an edited content including original content access information and metadata with respect to the original content in the general area 220 of the memory 130. The original content may be a content photographed by the camera module 180 or a content received from an external device (e.g., the server 108 or the electronic device 102 of FIG. 1). The content (or multimedia content) may include at least one of text (or words), an image, audio, or a video. The edited content is a content obtained by applying an editing effect to the original content. For example, the editing effect may refer to text insertion, brightness, color, a filter, or a decoration effect such as a sticker. The processor 120 may encode the original content to store the original content in the secure area 210, and encode the edited content to store the edited content in the general area 220. The processor 120 may store the edited content by including an editable flag (e.g., true) in the edited content.

According to various embodiments, the processor 120 may control such that a user cannot access the original content stored in the secure area 210, or can access the original content only by specific authority, so that the processor may manage the original content to be prevented from being exposed to the outside or being damaged due to deletion or transformation. For example, the processor 120 may selectively allow access to the original content only when user authentication through a fingerprint sensor (e.g., the sensor module 176 of FIG. 1) is successful. Alternatively, the processor 120 may not allow any user access to the original content.

The original content access information may include at least one of an access path (e.g., a storage location) of the original content, a resolution, a size, a generation date, or a capacity of the original content. The processor 120 may generate a first hash key, based on the original content access information, associate the generated first hash key with the original content to store the first hash key in the secure area 210, and associate the same first hash key with the edited content to store the first hash key in the general area 220. The first hash key may be used for associating the original content with the edited content.

According to various embodiments, the processor 120 may identify whether the original content is stored in the secure area 210 by using the first hash key stored together with the edited content, and if the original content is not stored, restore (or generate) the original content by using the metadata included in the edited content. If the original content is not stored, the processor 120 may decode the edited content stored in the general area 220 to extract metadata, and inversely apply the extracted metadata to the decoded edited content (e.g., an inverse function) to restore (or generate) the original content. If the original content is restored, the processor 120 may store the original content in the secure area 210 and generate original content access information (e.g., an access path of the original content) with respect to the original content, so as to update the original content access information stored together with the edited content in the general area 220. When the original content access information is updated, the processor 120 may newly generate a first hash key, based on the original content access information, store the new generated first hash key in the secure area 210 together with the original content, and store the same first hash key in the general area 220 together with the edited content.

According to various embodiments, the processor 120 may match and store one or more edited contents generated with reference to one original content, rather than one-to-one matching and storing an original content and an edited content. The processor 120 may store the edited content in association with the original content, so as to restore (generate) the original content by using the edited content or restore (generate) the edited content by using the original content.

For example, when there are a first edited content obtained by applying a first editing effect to the original content and a second edited content obtained by applying a second editing effect to the original content, the processor 120 may store, in the general area 220, the first edited content including original content access information and first metadata (e.g., the first editing effect) with respect to the original content, and the second edited content including original content access information and second metadata (e.g., the second editing effect) with respect to the original content. According to various embodiments, even when there are a plurality of edited contents corresponding to one original content, there is only one original content and thus a storage space of the memory 130 can be minimized.

According to various embodiments, the processor 120 may allow a plurality of edited contents to correspond to one original content (for example, 1:n), so that the processor does not delete the original content even when one edited content is deleted, and deletes the original content when a configured condition (e.g., all edited contents are deleted) is satisfied, so as to efficiently manage the original content.

The metadata may include at least one of editing engine information (e.g., an editing effect) of the edited content, a resolution, a size, a generation date, or a capacity of the edited content. The editing engine information may include at least one of an editing engine name, an editing engine type (e.g., general (public) or personal), or editing engine configuration information (e.g., editing information). The editing engine information may be stored in the general area 220. The editing engine information included in the metadata may be stored in the general area 220. The processor 120 may generate a second hash key, based on the editing engine information, and include the generated second hash key in the metadata. The metadata may include at least one of the second hash key corresponding to the editing engine information, a resolution, a size, a generation date, or a capacity of the edited content. Alternately, the processor 120 may generate a second hash key, based on the editing engine configuration information among the editing engine information, and include the generated second hash key in the metadata. The metadata may include at least one of an editing engine name, an editing engine type, the second hash key corresponding to the editing engine configuration information, a resolution, a size, a generation date, or a capacity of the edited content.

For example, the processor 120 may separately store editing engine information or a hash key corresponding to the editing engine information in a storage space distinguished from an edited content. When a second hash key included in metadata of a content received from the electronic device 102 is different from a hash key of the editing engine information stored in the general area 220, the processor 120 may not allow content editing.

The processor 120 may receive editing engine information from a user or acquire editing engine information by analyzing a content edited by the user. The user can generate, delete, or modify a name or an editing effect of the editing engine information. For example, the processor 120 may receive, from the user, first editing engine information named "My filter 1" including a brightness of 80% d and a warm tone. Alternatively, the processor 120 may receive, from the user, second editing engine information named "My photoeditor" including a first filter and a first style. The editing engine information generated, deleted, or modified by the user may have an editing engine type of "personal type," and the editing engine information, which is not generated by the user, may have an editing engine type of "general (or public) type."

The processor 120 may store the metadata in the secure area 210 together with the original content. The processor 120 may encrypt and store the metadata in the secure area 210. When an edited content is damaged, the processor 120 may generate (or restore) the edited content by using the metadata and the original content. For example, the processor 120 may generate the edited content by applying the metadata to the original content.

According to various embodiments, the processor 120 may transmit or share the original content externally (e.g., the server 108, the electronic device 102, or the electronic device 104) according to a user's selection. When the original content is stored in the server 108, the processor 120 may include, in the original content access information, an access path of the server 108 in which the original content is stored, and store the same in the secure area 210, or encrypt the access path of the server 108 with a first hash key and store the same in the general area 220 together with the edited content.

When the original content is stored in the server 108, the access path of the server 108 may be included in the original content access information. Since the processor 120 generates a first hash key, based on the original content access information, when the first hash key is decoded, the processor may identify whether the original content is stored in the secure area 210 or is stored in the server 108. When the original content or the edited content is required, the processor 120 may download the original content from the server 108 and generate the edited content by applying the metadata to the downloaded original content.

The electronic device 102 may receive the original content and the edited content from the electronic device 101, and generate a new edited content by using the original content. For example, the edited content received from the electronic device 101 may be a first edited content obtained by applying a first editing effect to the original content. The electronic device 102 may generate a second edited content obtained by applying a second editing effect to the original content according to a user's selection. Instead of additionally applying the second editing effect to the first edited content, the electronic device 102 may maintain the first edited content as it is and generate the second edited content obtained by applying the second editing effect to the original content.

An electronic device (e.g., the electronic device 101 of FIG. 1) according to various embodiments may include a camera module (e.g., the camera module 180 of FIG. 1), a communication module (e.g., the communication module 190 of FIG. 1), a memory (e.g., the memory 130 of FIG. 1), and a processor (e.g., the processor 120 of FIG. 1) operatively coupled to the camera module, the communication module, and the memory, wherein the processor acquires a first content through the camera module or the communication module, generates a second content by editing the first content, based on a user input, stores the acquired first content in a secure area (e.g., the secure area 210 of FIG. 2) of the memory, and stores the second content including metadata corresponding to the second content and first content access information corresponding to the first content in a general area (e.g., the general area 220 of FIG. 2) of the memory, and the first content access information associates the first content with the second content.

The processor may be configured to generate a first hash key, based on the first content access information, associate the generated first hash key with the first content to store the first hash key in the secure area, and associate the generated first hash key with the second content to store the first hash key in the general area.

The processor may be configured to identify whether the first content is stored in the secure area by using the first hash key stored in the general area, and when the first content is not stored in the secure area, restore the first content by using the metadata included in the second content.

The processor may be configured to, when the first content is restored, store the first content in the secure area, and generate the first content access information corresponding to the first content to update the first content access information included in the second content stored in the general area.

The processor may be configured to, as the first content access information is updated, generate a new first hash key, based on the updated first content access information, associate the generated new first hash key with the first content to store the first hash key in the secure area, and associate the new first hash key with the second content to store the first hash key in the general area.

The processor may be configured to decode the first hash key stored in the secure area to acquire an access path of a server, and download the first content from the server.

The processor may be configured to associate the metadata with the first content to store the metadata in the secure area, and restore the second content by using the metadata and the first content when the second content does not exist in the general area or the second content is damaged.

The processor may be configured to display at least one second content, determine whether the displayed second content can be edited, search for a first content corresponding to the displayed second content when the displayed second content can be edited, and display a second content obtained by applying first metadata to the first content.

The processor may be configured to edit the first content, based on a user input, generate a third content obtained by applying second metadata corresponding to the edit, and further store the third content including the first content access information and the second metadata corresponding to the third content in the general area.

The processor may generate a second hash key by using editing engine information included in the metadata, include the second hash key in the metadata to store the second hash key, and store the editing engine information in the general area.

When a second hash key included in metadata of a second content requested to be edited is different from a hash key of the editing engine information stored in the general area, the processor may be configured to disallow the editing request.

The processor may be configured to, when a content transmission request is received, determine whether a first content corresponding to a second content requested to be transmitted exists, and when the first content exists, transmit at least one of the second content requested to be transmitted or the first content according to a user's selection.

The processor may be configured to determine whether the first content corresponding to the second content requested to be transmitted exists, based on whether the first hash key is included in the second content requested to be transmitted.

Figure 3:
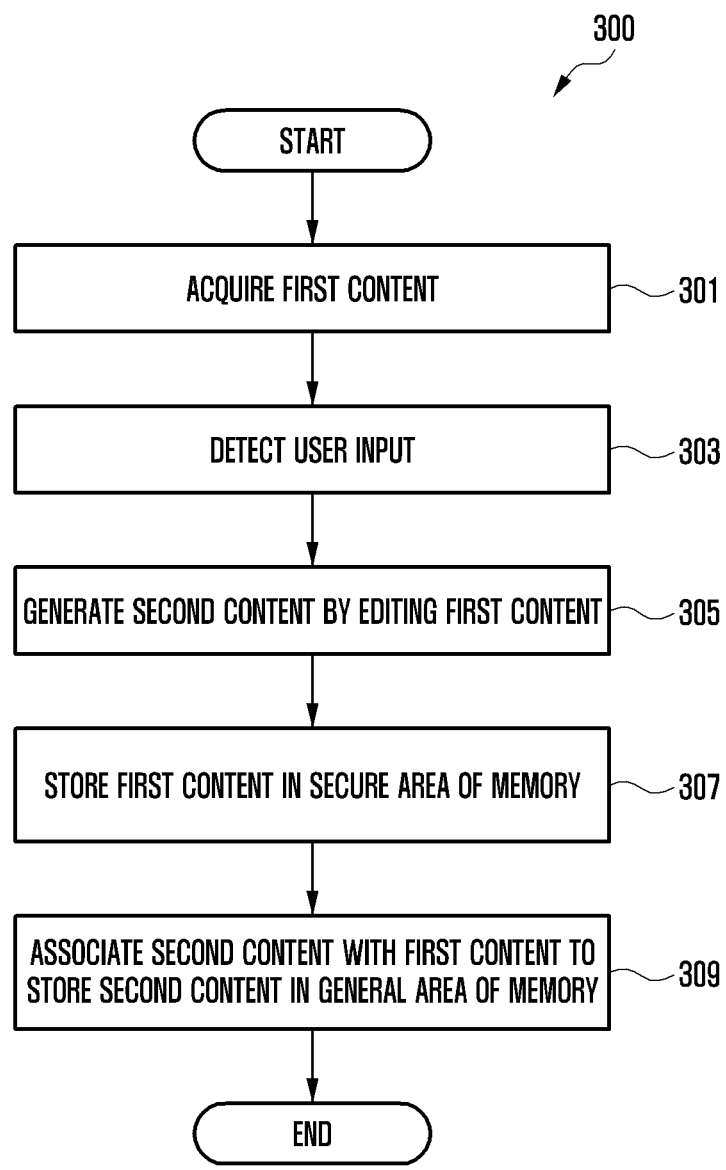
FIG. 3 is a flowchart illustrating an operating method of an electronic device according to various embodiments.

FIG. 3 is a flowchart 300 illustrating an operating method of an electronic device according to an embodiment of the disclosure.

Referring to FIG. 3, in operation 301, a processor (e.g., the processor 120 of FIG. 1) of an electronic device (e.g., the electronic device 101 of FIG. 1) according to various embodiments may acquire a first content. The first content may be a content photographed by the camera module 180 or a content received from an external device (e.g., the server 108 or the electronic device 102 of FIG. 1). The content (or multimedia content) may include at least one of text (or words), an image, audio, or a video. The first content may be an original content, and hereinafter, the original content may be referred to as a first content, and an edited content may be referred to as a second content.

According to various embodiments, when the first content photographed by the camera module 180 is stored without editing, the processor 120 may store the first content in a general area (e.g., the general area 220 of FIG. 2) of the memory 130. Alternatively, when the first content received from the server 108 or the electronic device 102 is not the edited content, but is the original content (e.g., when metadata of the first content does not include a hash key of editing engine information), the processor 120 may store the first content in the general area 220. When the first content stored in the general area 220 is later edited by a user, the processor 120 may store the first content stored in the general area 220 in a secure area (e.g., the secure area 210 of FIG. 2) of the memory 130, and store an edited second content in the general area 220.

In operation 303, the processor 120 may detect a user input. The user input may be an input for editing of the first content. The editing of the first content may be adjusting the brightness or color of the first content, or applying a filter or a sticker to the first content.

In operation 305, the processor 120 may generate a second content by editing the first content, based on the user input. The second content may be an edited content and may be obtained by applying an editing effect to the first content. The editing effect may be generated as metadata of the second content.

In operation 307, the processor 120 may store the first content in the secure area (e.g., the secure area 210 of FIG. 2) of the memory (e.g., the memory 130 of FIG. 1). According to various embodiments, the processor 120 may control such that a user cannot access the first content stored in the secure area 210, or can access the first content only by specific authority. According to various embodiments, the processor 120 may store the first content in the secure area 210 together with access information with respect to the first content. The first content access information (or original content access information) may include at least one of an access path (e.g., a storage location) of the first content, a resolution, a size, a generation date, or a capacity of the first content. The processor 120 may generate a first hash key, based on the first content access information, and store the generated first hash key in the secure area 210 together with the first content.

The processor 120 may identify whether the first content exists by using the first hash key. For example, when the first hash key is stored in the secure area 210 or the general area 220, the processor 120 may determine that the first content exists, and when the first hash key is not stored, the processor 120 may determine that the first content does not exist. When only the first hash key is stored and the first content is not stored in the memory 130, the processor 120 may download or restore the first content by using the first hash key. Alternatively, when the first hash key is not stored and the first content is stored in the memory 130, the processor 120 may generate the first hash key by using the first content and store the generated first hash key in the memory 130.

In the drawings, although operation 307 is described as being performed after operation 303 and operation 305, operation 307 may be performed while operations 303 and 305 are performed or simultaneously with operation 309. This only corresponds to an implementation issue, and the disclosure is not limited by the description.

In operation 309, the processor 120 may associate the second content with the first content and store the second content in the general area 220. The processor 120 may store the second content including the first content access information and the metadata with respect to the first content in the general area 220. The processor 120 may store a first hash key generated based on the first content access information, and store the generated first hash key in the general area 220 together with the second content. The processor 120 may associate the first hash key stored in association with the first content in the secure area 210 with the second content, and store the first hash key in the general area 220. For example, the processor 120 may insert at least one of the metadata, the first content access information, or the first hash key into the second content. The first hash key may associate (or link) the first content stored in the secure area 210 with the second content stored in the general area 220. The processor 120 may store the second content by including an editable flag (e.g., true) in the second content.

According to various embodiments, the processor 120 may identify whether the first content exists by using the first hash key. For example, when a second content selected by a user includes the first hash key, the processor may identify whether the same first hash key is stored in the secure area 210 to determine whether the first content exists.

The metadata may include at least one of editing engine information of the second content, a resolution, a size, a generation date, or a capacity of the edited content. The editing engine information included in the metadata may be stored in the general area 220. The processor 120 may generate a second hash key, based on the editing engine information, and include the generated second hash key in the metadata. The metadata may include at least one of the second hash key corresponding to the editing engine information, a resolution, a size, a generation date, or a capacity of the edited content. Alternately, the processor 120 may generate a second hash key, based on editing engine configuration information among the editing engine information, and include the generated second hash key in the metadata. The metadata may include at least one of an editing engine name, an editing engine type, the second hash key corresponding to the editing engine configuration information, a resolution, a size, a generation date, or a capacity of the edited content.

Figure 4:
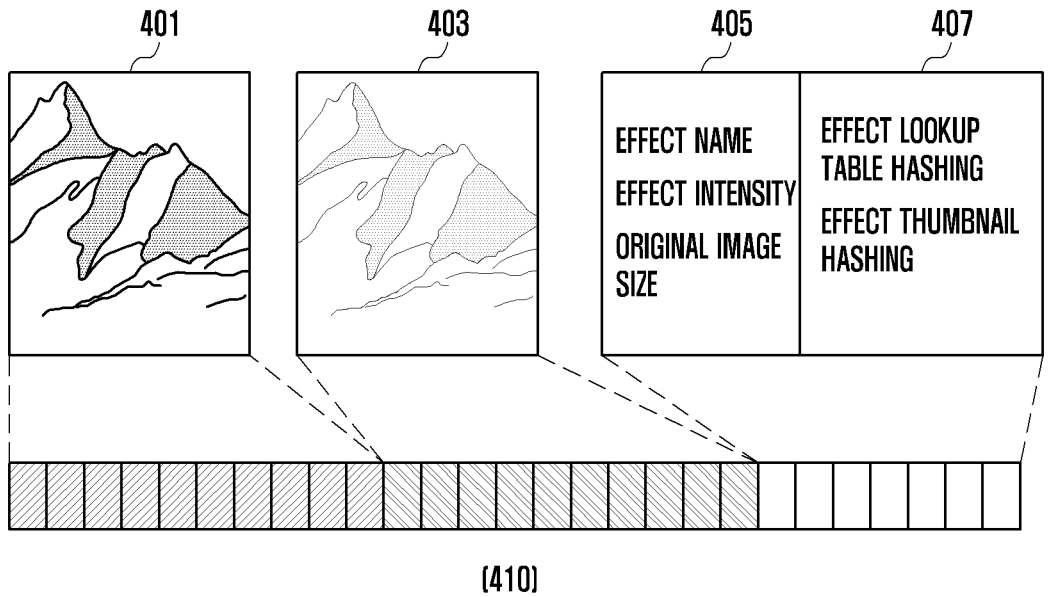
FIG. 4 illustrates an example of a comparison between the disclosure and a comparative example according to various embodiments.
Figure 4:
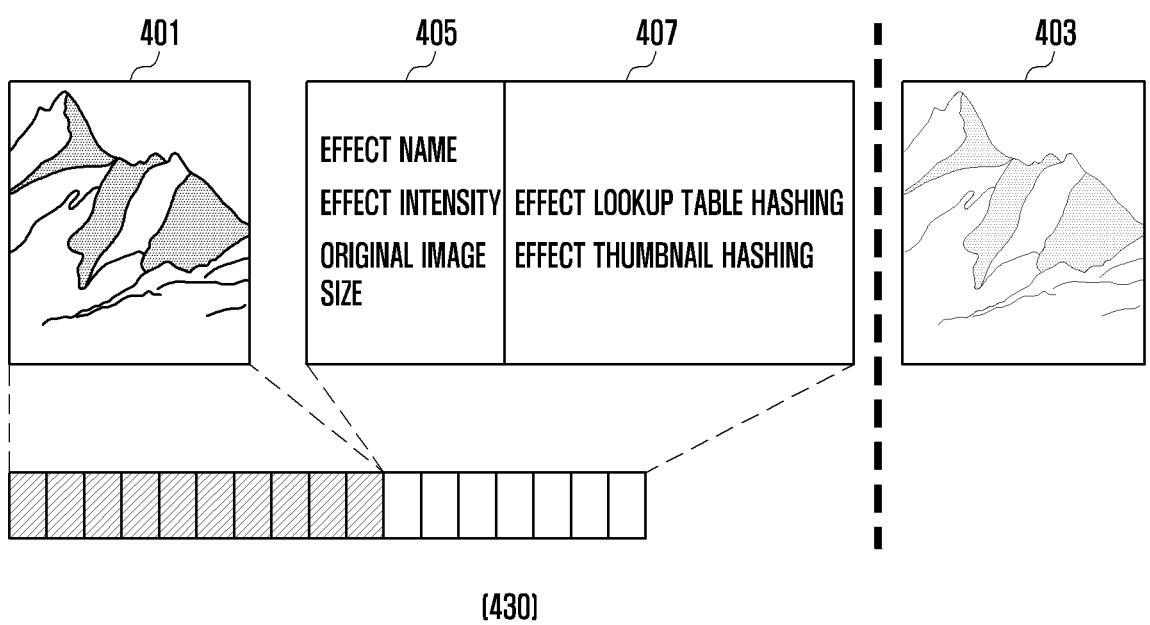

FIG. 4 illustrates an example of a comparison between the disclosure and a comparative example according to an embodiment of the disclosure.

Referring to FIG. 4, according to a comparative example 410, conventionally, at the time of storing a second content 401 (e.g., an edited content) obtained by editing a first content 403 (e.g., an original content), the first content 403 is included and stored in the second content 401. The second content 401 may further include first content access information 405 with respect to the first content 403 and metadata 407 (e.g., first metadata) corresponding to the second content 401. According to the comparative example 410, when a third content (not shown) newly edited with respect to the first content 403 is generated, the new third content (e.g., a second edited content) may include the first content 403, the first content access information 405, and metadata (e.g., second metadata) corresponding to the new third content. That is, according to the comparative example 410, since the first content 403 also increases in size proportionally whenever a new third content (not shown) with respect to the first content 403 is generated, an unnecessarily large amount of storage space of an electronic device may be occupied.

According to the disclosure 430, at the time of storing the second content 401 obtained by editing the first content 403, the first content 403 may be stored in a secure area (e.g., the secure area 210 of FIG. 2) of a memory (e.g., the memory 130 of FIG. 1), and the second content 401 may be stored in a general area (e.g., the general area 220 of FIG. 2) of the memory 130 together with the first content access information 405 and the metadata 407. According to the disclosure 430, when a third content (not shown) newly edited with respect to the first content 403 is generated, the new third content (e.g., a second edited content) may include the first content access information 405 and metadata (e.g., second metadata) corresponding to the new third content. According to the disclosure 430, there may be one first content 403 and a plurality of edited contents, and each of the edited contents may be linked with the first content 403. In addition, according to the disclosure 430, a first hash key may be generated based on the first content access information 405, the generated first hash key may be associated with the first content 403 and stored in the secure area 210, and the same first hash key may be associated with the second content 401 and stored in the general area 220.

Figure 5:
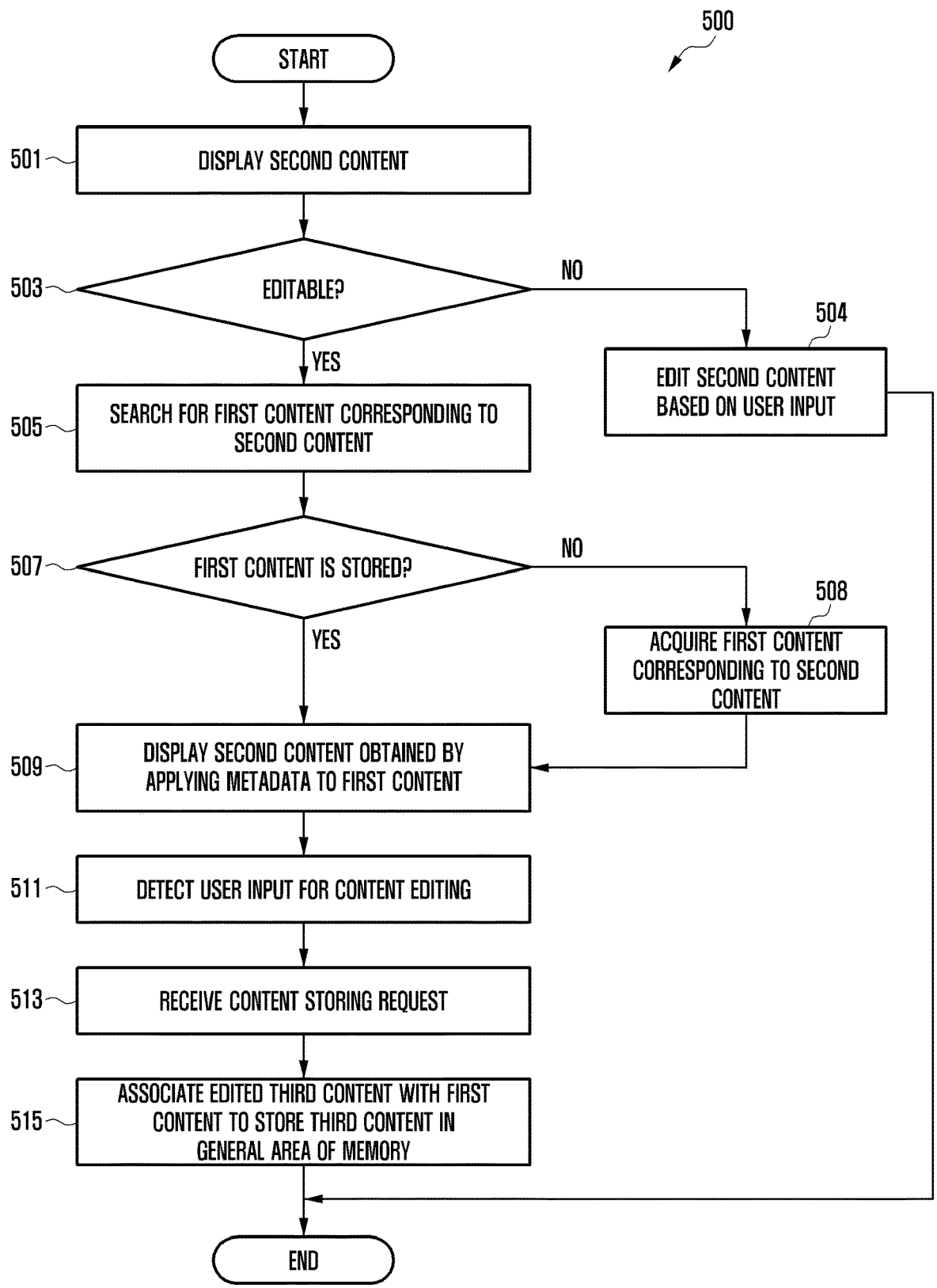
FIG. 5 is a flowchart illustrating a method for re-editing a content by an electronic device according to various embodiments.

FIG. 5 is a flowchart 500 illustrating a method for re-editing a content by an electronic device according to an embodiment of the disclosure.

Referring to FIG. 5, in operation 501, a processor (e.g., the processor 120 of FIG. 1) of an electronic device (e.g., the electronic device 101 of FIG. 1) according to various embodiments may display a second content. The processor 120 may display a second content edited after being photographed through a camera module (e.g., the camera module 180 of FIG. 1), display a second content selected by a user on an execution screen of a gallery application (or a photo viewing application), or display a second content received from an external device (e.g., the server 108 or the electronic device 102 of FIG. 1). In the following description, the second content may be described as an edited content. The second content may include metadata corresponding to the second content (e.g., the edited content) and first content access information corresponding to the first content.

In operation 503, the processor 120 may determine whether the displayed second content can be edited. Alternatively, when the displayed second content includes a first hash key, the processor 120 may determine that the second content can be edited. Alternatively, when a flag indicating editability (e.g., true) or non-editability (e.g., false) in the displayed second content is marked as editable, the processor 120 may determine that the second content can be edited. The processor 120 may perform operation 505 when the displayed second content can be edited, and may perform operation 504 when the displayed second content cannot be edited.

According to various embodiments, the metadata included in the second content may include at least one of editing engine information of the second content, a resolution, a size, a generation date, or a capacity of the second content. The editing engine information may include at least one of an editing engine name, an editing engine type (e.g., general or personal), or editing engine configuration information (e.g., editing information). The metadata may include a second hash key generated based on the editing engine information or a second hash key generated based on the editing engine configuration information among the editing engine information. When the second content is a content received from the electronic device 102, if a second hash key included in the metadata of the second content is different from a hash key of the editing engine information stored in the general area 220, the processor 120 may not allow content editing.

For example, editing engine information included in the metadata or a second hash key corresponding to the editing engine information may be stored in the general area 220. Since the second hash key included in the second content is generated based on the editing engine information, when at least one of the editing engine name, editing engine type, or editing engine configuration information is different, the second hash key may be generated differently. For example, even if an editing engine name or an editing engine type is the same, when editing engine configuration information is different, a second hash key may be different. Alternatively, even if editing engine configuration information is the same, when an editing engine name or an editing engine type is different, a second hash key may be different. When the hash key of the editing engine information stored in the general area 220 is different from the second hash key included in the metadata of the second content, an error may occur during content editing, and thus the processor 120 may not allow content editing.

According to various embodiments, even in a case where an editing engine name or editing engine type included in the metadata of the second content is the same as an editing engine name or editing engine type stored in the general area 220, when a second hash key of the editing engine configuration information included in the metadata is different from a hash key of the editing engine configuration information stored in the general area 220, the processor 120 may not allow content editing.

According to various embodiments, the processor 120 may selectively compare the hash key of the editing engine configuration information stored in the general area 220 with the second hash key of the editing engine configuration information included in the metadata of the second content, based on the editing engine type. For example, in a case where the editing engine type is a general type, the editing engine configuration information cannot be edited by a user, and in a case where the editing engine type is a personal type, the editing engine configuration information can be edited by a user. The editing engine type may be determined when the editing engine information is generated. In the case where the editing engine type is the personal type, the processor 120 may compare the hash key of the editing engine configuration information stored in the general area 220 with the second hash key of the editing engine configuration information included in the metadata of the second content, and selectively allow content editing only when the hash keys are the same. In the case where the editing engine type is the personal type, when the hash key of the editing engine configuration information stored in the general area 220 is different from the second hash key of the editing engine configuration information included in the metadata of the second content, the processor 120 may not allow content editing.

If the displayed content cannot be edited, in operation 504, the processor 120 may edit the displayed second content, based on a user input. If the first content (e.g., the original content) is not stored with respect to the displayed second content, or the first content with respect to the displayed second content cannot be restored, the processor 120 may edit the displayed second content, based on a user input. The processor 120 may additionally apply an editing effect to the second content, based on the user input.

If the displayed second content can be edited, in operation 505, the processor 120 may search for a first content corresponding to the displayed second content. In a case where the second content is the first content, operations 505 to 509 may be omitted. The processor 120 may extract a first hash key included in the displayed second content and identify whether the same first hash key is stored in a secure area (e.g., the secure area 210 in FIG. 2) of a memory (e.g., the memory 130 of FIG. 1). The processor 120 may search for the first content corresponding to the displayed second content in the secure area 210.

In operation 507, the processor 120 may determine whether the first content corresponding to the displayed second content is stored. Although the first hash key included in the displayed second content is stored in the secure area 210, the first content may not be stored in the secure area 210. For example, a user may store the first content in a cloud server (e.g., the server 108) for security of the first content. When the first content is stored in the server 108, the processor 120 may generate first content access information including an access path of the server 108 in which the first content is stored. Since the processor 120 generates a first hash key, based on the first content access information, the processor may identify that the first content is stored in the server 108 by decoding the first hash key. Alternatively, only the first hash key may be stored in the secure area 210 due to the format of the electronic device 101. The processor 120 may perform operation 509 when the first content is stored, and may perform operation 508 when the first content is not stored.

According to various embodiments, when the first hash key included in the second content is not stored in the secure area 210, the processor 120 may decode the first hash key to extract a storage location of the first content, and generate the first hash key by using the first content stored in the storage location of the first content and store the first hash key in the secure area 210.

If the first content is not stored, in operation 508, the processor 120 may acquire the first content corresponding to the displayed second content. The acquisition of the first content may be downloading of the first content from the server 108 or restoring (or generating) of the first content by using the second content. For example, the processor 120 may decode the first hash key stored in the secure area 210 to acquire the access path of the server 108, and download the first content from the server 108. The server 108 may encode and store the first content, and decode and transmit the first content according to a download request of the electronic device 101. The processor 120 may receive the decoded first content from the server 108 through a communication module (e.g., the communication module 190). When the processor 120 downloads the first content, the processor 120 may store the first content in the secure area 210, generate first content access information (e.g., an access path of the original content) with respect to the first content, and thus update the first content access information included in the second content.

According to various embodiments, the processor 120 may restore the first content by using metadata included in the displayed second content. The displayed second content is an edited content, and the edited content may include first content access information and metadata with respect to the first content. The processor 120 may restore the first content by inversely applying the metadata to the displayed second content. When the first content is restored, the processor 120 may store the first content in the secure area 210, generate the first content access information (e.g., an access path of the original content) with respect to the first content, and thus update the first content access information included in the second content.

When the first content access information is updated, the processor 120 may newly generate a first hash key, based on the updated first content access information, associate the generated first hash key with the first content to store the first hash key in the secure area 210, and associate the same first hash key with the second content to store the first hash key in the general area 220. When the first content access information is updated, the processor 120 may update the first hash key included in the second content. The processor 120 may perform operation 509 when obtaining the first content.

In operation 509, the processor 120 may display the second content obtained by applying the metadata to the first content. Operation 509 refers to content displaying for content editing, and since a user can re-edit the edited content, metadata may be applied to the first content and displayed in order to apply a new editing effect to the first content at the time of re-editing. When "revert" is requested according to a user's request, the processor 120 may cancel the applied metadata and display the first content.

In operation 511, the processor 120 may detect a user input for editing content. The user input may be an input for applying an editing effect to the displayed second content. The processor 120 may edit the second content by applying an editing effect to the displayed second content, based on the user input.

In operation 513, the processor 120 may receive a content storing request from the user. The storing request may be overwriting (e.g., saving) of a newly edited effect on the edited content, or newly storing (e.g., saving as a different name) of the content to which the newly edited effect is applied. When the application of the metadata is cancelled and the content storing is requested in a state where the first content is displayed, the processor 120 may update the first content to a third content and store the third content.

In operation 515, the processor 120 may associate the edited third content with the first content, and store the third content in the general area 220 of the memory 130. For example, when the second content displayed in operation 501 is a first edited content and a new editing effect (e.g., a second editing effect) is applied to the first content in operation 511, the processor 120 may update the first edited content or generate a second edited content according to a user's selection. For example, when a user applies a second editing effect and selects "save," the processor 120 may store the second content by applying the second editing effect to the first content. For example, in operation 501, the first edited content (e.g., the second content) may have the first editing effect applied thereto, and in operation 515, the first edited content (e.g., the second content) may have the second editing effect applied thereto. The processor 120 may store the first edited content by including first content access information and second metadata that is the second editing effect in the first edited content. In this case, since the first edited content is updated, only the first edited content may be stored in the general area 220.

According to various embodiments, the processor 120 may generate second editing engine information to correspond to the second metadata. The processor 120 may generate first editing engine information to correspond to the first metadata and store the first editing engine information in the general area 220, and generate the second editing engine information to correspond to the second metadata and store the second editing engine information in the general area 220. Alternatively, the processor 120 may update the first editing engine information corresponding to the first metadata, so as to correspond to the second metadata, and store the updated first editing engine information in the general area 220.

When a user applies the second editing effect and selects "save as a different name," the processor 120 may store the second edited content (e.g., a third content) obtained by applying the second editing effect to the first content. The processor 120 may store the second edited content by including the first content access information and the second metadata in the second edited content. In this case, since the second edited content is generated, the first edited content (e.g., a second content) and the second edited content (e.g., a third content) may be stored in the general area 220. The second content may include the first metadata and the first content access information, and the third content may include the second metadata and the first content access information.

According to various embodiments, the processor 120 may generate second editing engine information to correspond to the second metadata. The processor 120 may generate first editing engine information to correspond to the first metadata and store the first editing engine information in the general area 220, and generate the second editing engine information to correspond to the second metadata and store the second editing engine information in the general area 220. The processor 120 may generate a second hash key, based on the second editing engine information, and include the generated second hash key in the second metadata. The second metadata may include at least one of the second hash key corresponding to the second editing engine information, a resolution, a size, a generation date, or a capacity of the third content. Alternately, the processor 120 may generate a second hash key, based on second editing engine configuration information among the second editing engine information, and include the generated second hash key in the second metadata. The second metadata may include at least one of a second editing engine name, a second editing engine type, the second hash key corresponding to the second editing engine configuration information, a resolution, a size, a generation date, or a capacity of the third content.

FIGS. 6A to 6D illustrate examples of managing a non-destructively edited content according to various embodiments of the disclosure.

Figure 6A:
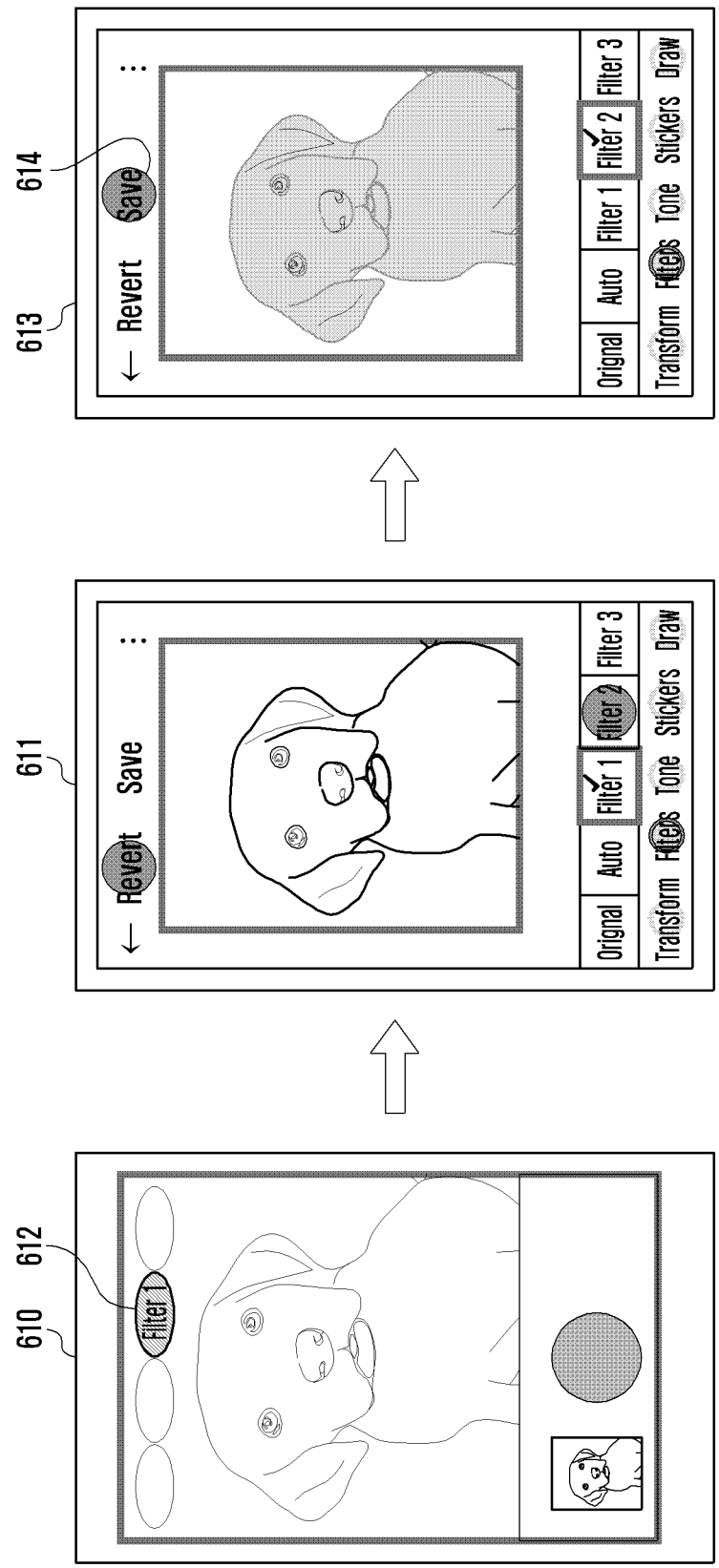
FIGS. 6A to 6D illustrate examples of managing a non-destructively edited content according to various embodiments.

FIG. 6A illustrates a first example of managing a non-destructively edited content according to an embodiment of the disclosure.

Referring to FIG. 6A, a processor (e.g., the processor 120 of FIG. 1) of an electronic device (e.g., the electronic device 101 of FIG. 1) according to various embodiments may provide (or display) a first user interface 610 including a first content to a display (e.g., the display module 160 of FIG. 1). The first content may be an original content acquired from the camera module 180 or an original content received from an external device (e.g., the server 108 or the electronic device 102 of FIG. 1). The processor 120 may apply an editing effect to the first content, based on a user input. For example, the processor 120 may receive a selection of a first filter 612 as an editing effect in the first user interface 610. The processor 120 may provide a second user interface 611 obtained by applying a first editing effect to the first content.

The second user interface 611 may include a second content obtained by applying the first editing effect to the first content. The processor 120 may receive a selection of "revert" or "save" from a user in the second user interface 611. When "save" is selected, the processor 120 may store the first content in a secure area (e.g., the secure area 210 of FIG. 2) of a memory (e.g., the memory 130 of FIG. 1), and store the second content including first content access information (e.g., an access path of the original content) and first metadata corresponding to the second content in a general area (e.g., the general area 220 FIG. 2) of the memory 130.

Alternatively, a user may cancel the first editing effect and apply a second editing effect (e.g., a second filter) to the first content. The processor 120 may provide a third user interface 613 obtained by applying the second editing effect to the first content. The third user interface 613 may include a third content (e.g., a second edited content) obtained by applying the second editing effect to the first content. The processor 120 may receive a selection of "revert" or "save" 614 from a user in the third user interface 613. When "save" 614 is selected, the processor 120 may store the third content including the first content access information and second metadata corresponding to the third content in the general area 220 of the memory 130.

Figure 6B:
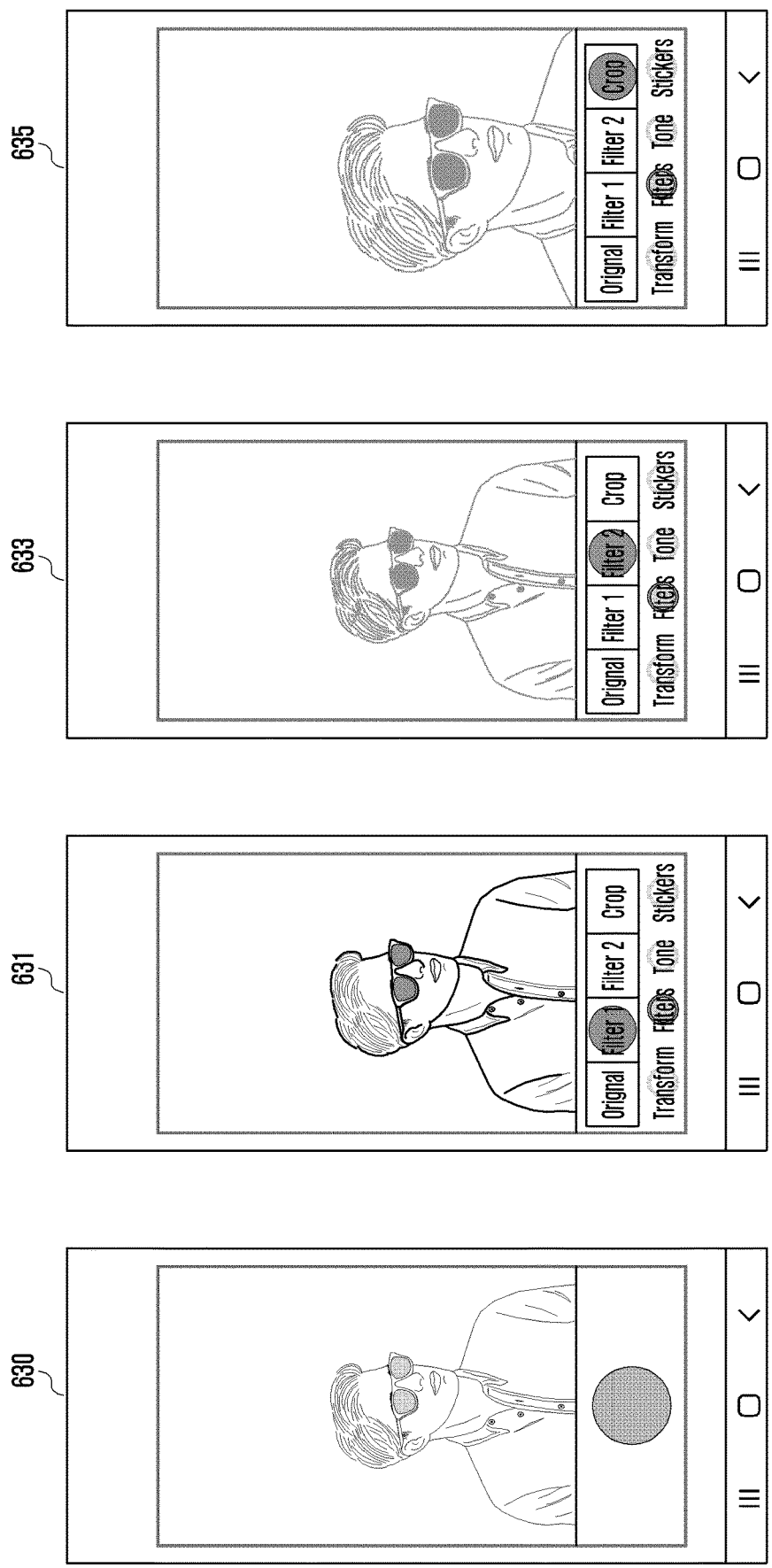

FIG. 6B illustrates a second example of managing a non-destructively edited content according to an embodiment of the disclosure.

Referring to FIG. 6B, the processor 120 may provide a first user interface 630 including a first content. The processor 120 may apply an editing effect to the first content, based on a user input. A second user interface 631 may include a second content obtained by applying a first editing effect (e.g., a first filter or first editing engine information) to the first content. A third user interface 633 may include a third content (e.g., a second edited content) obtained by applying a second editing effect (e.g., a second filter or second editing engine information) to the first content. A fourth user interface 635 may include a fourth content (e.g., a third edited content) obtained by applying a third editing effect (e.g., cropping or third editing engine information) to the first content. For example, the processor 120 may store all of the second content to the fourth content according to a user's selection. The processor 120 may store the first content in the secure area 210 of the memory 130, and store, in the general area 220 of the memory 130, the second content including first content access information and first metadata corresponding to the second content, the third content including the first content access information and second metadata corresponding to the third content, and the fourth content including the first content access information and third metadata corresponding to the fourth content. When three edited contents are generated from one original content, the processor 120 may store only one original content and store the three edited contents by associating each of the three edited contents with the original content.

Figure 6C:
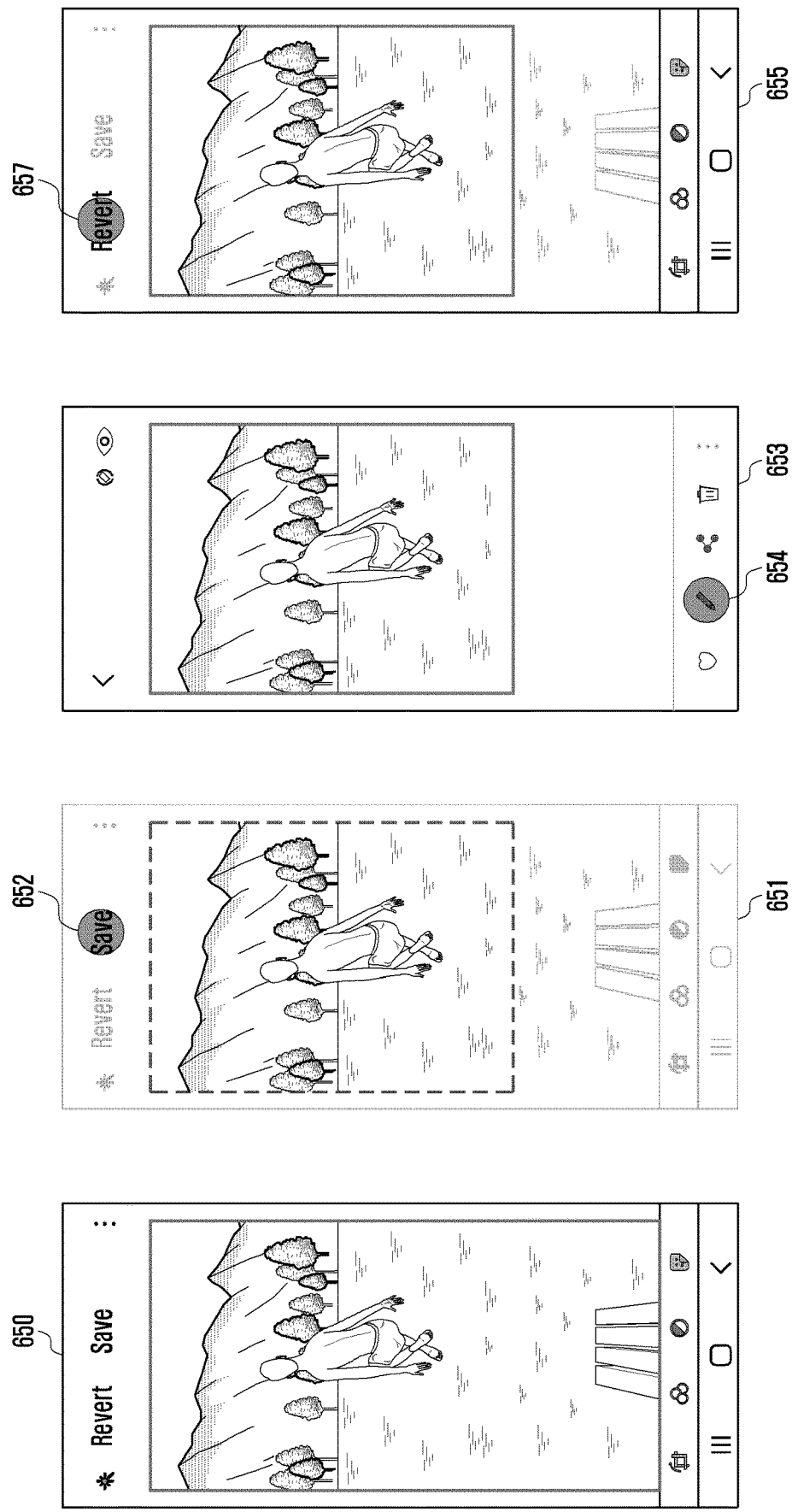

FIG. 6C illustrates a third example of managing a non-destructively edited content according to an embodiment of the disclosure.

Referring to FIG. 6C, the processor 120 may provide a first user interface 650 including a first content. The processor 120 may apply an editing effect to the first content, based on a user input. A second user interface 651 may include a second content (e.g., a first edited content) obtained by applying a first editing effect (e.g., first editing engine information) to the first content. When the processor 120 receives a selection of "save" 652 in the second user interface 651, the processor 120 may store the first content in the secure area 210 of the memory 130, and store the second content including first metadata and first content access information in the general area 220 of the memory 130.

A user may select (or load) the second content by executing a gallery application. The processor 120 may provide a third user interface 653 including the second content stored in the general area 220, based on the user input. The processor 120 may determine whether the second content can be edited, and if the content can be edited, when the user selects an edit button 654 in the third user interface 653, the processor 120 may provide a fourth user interface 655 obtained by applying the first editing effect to the first content stored in the secure area 210. When the user selects "revert" 657 in the fourth user interface 655, the processor 120 may provide the first user interface 650 including the first content. Alternatively, when the processor 120 detects a user input for content editing in the fourth user interface 655, the processor may edit the second content, based on the user input. When there is a request to save the edited content, the processor 120 may store the edited second content in association with the first content in the general area 220 of the memory 130.

Figure 6D:
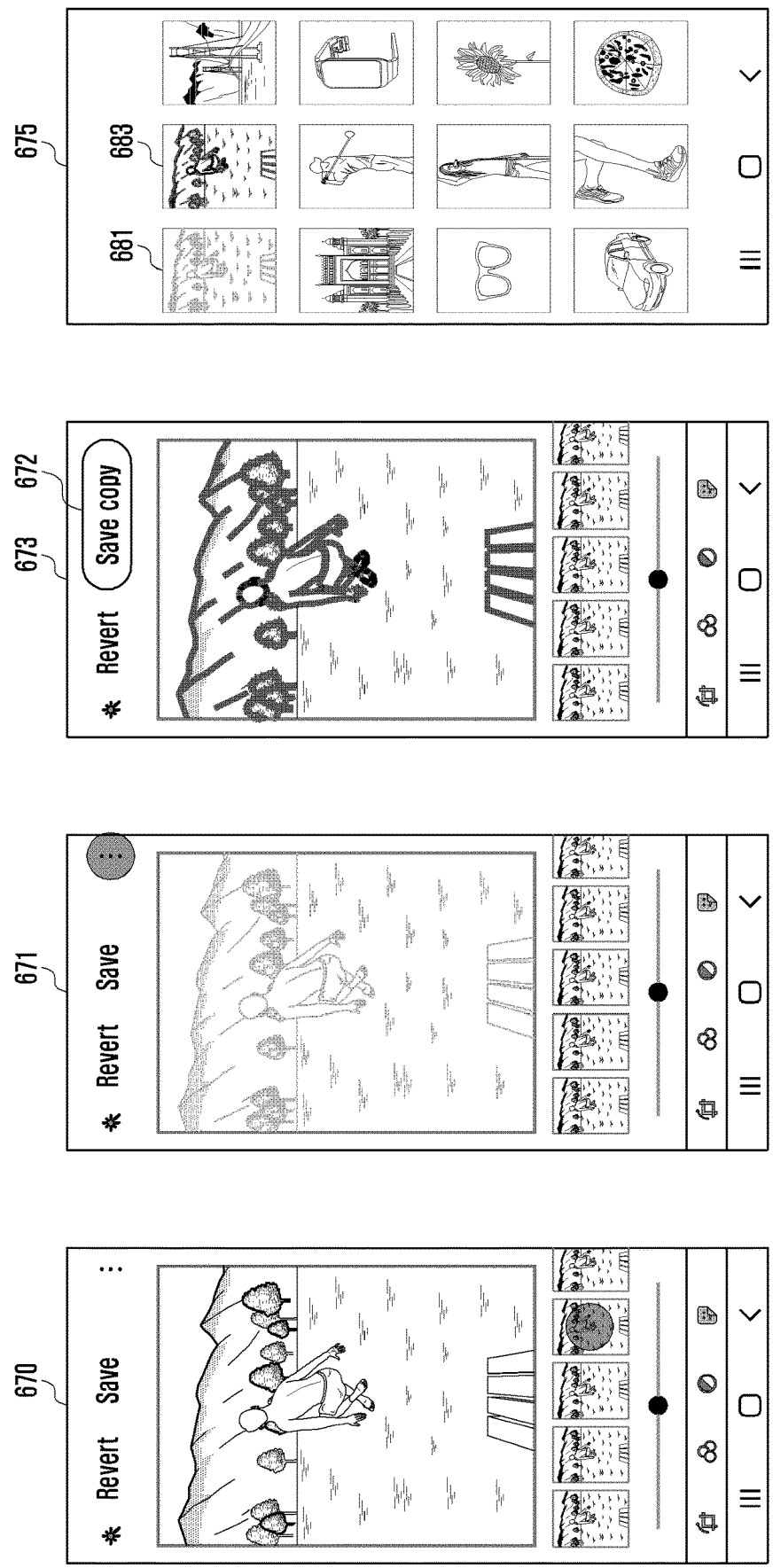

FIG. 6D illustrates a fourth example of managing a non-destructively edited content according to an embodiment of the disclosure.

Referring to FIG. 6D, the processor 120 may provide a first user interface 670 including an original content. The processor 120 may apply an editing effect to a first content, based on a user input. A second user interface 671 may include a second content (e.g., a first edited content) obtained by applying a first editing effect (e.g., first editing engine information) to the first content. The processor 120 may cancel the first editing effect in the second content and apply a second editing effect (e.g., second editing engine information), based on a user input. A third user interface 673 may include a third content (e.g., a second edited content) obtained by applying the second editing effect to the first content. When the processor 120 receives a selection of "save copy" 672 in the third user interface 673, the processor 120 may store the third content including second metadata that is a second editing effect and original content access information in the general area 220 of the memory 130. A fourth user interface 675 may be an execution screen of a gallery application, and include both the second content 681 and the third content 683. When two edited contents are generated from one original content, the processor 120 may store only one original content and store the two edited contents by associating each of the two edited contents with the original content.

Figure 7:
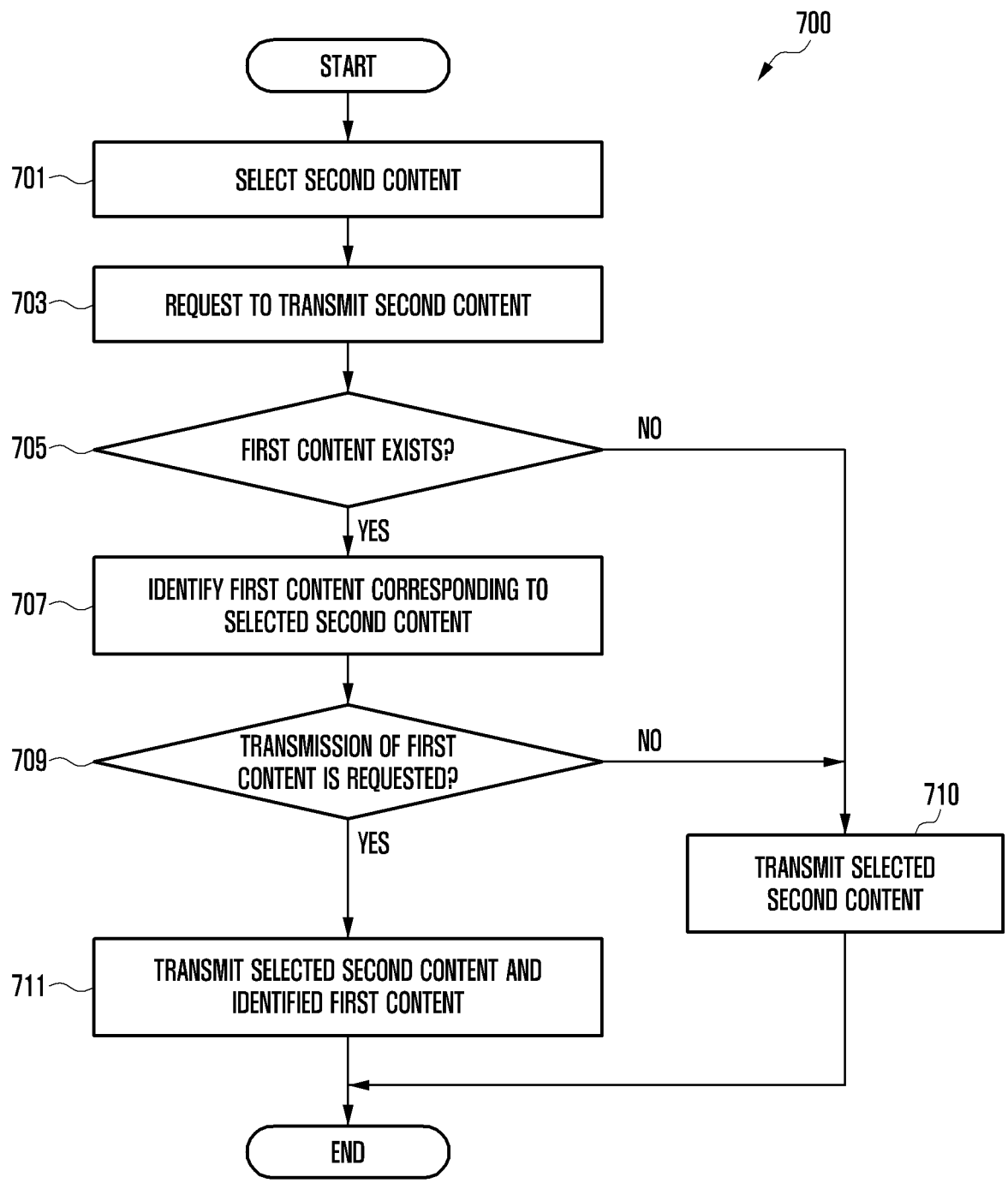
FIG. 7 is a flowchart illustrating a method for managing a non-destructively edited content by an electronic device according to various embodiments.

FIG. 7 is a flowchart 700 illustrating a method for managing a non-destructively edited content by an electronic device according to an embodiment of the disclosure.

Referring to FIG. 7, in operation 701, a processor (e.g., the processor 120 of FIG. 1) of an electronic device (e.g., the electronic device 101 of FIG. 1) according to various embodiments may select a second content. The second content selection may be performed when the content is displayed, the content is transmitted, or the content is shared. For example, the processor 120 may receive at least one second content selected by a user on an execution screen of a gallery application. Alternatively, the processor 120 may receive at least one second content selected by a user when a messenger application or a content sharing application transmits (or uploads a file) a file. The processor 120 may display the selected second content on a display (e.g., the display module 160 of FIG. 1).

In operation 703, the processor 120 may receive a request to transmit the selected second content. A user requests the transmission (or sharing) of the second content selected through the execution screen of the gallery application, the transmission of the second content selected through the messenger application, or the uploading of the second content selected through the content sharing application.

In operation 705, the processor 120 may determine whether a first content (e.g., an original content) corresponding to the selected second content exists. For example, the processor 120 may determine whether a first hash key is included in the selected second content. The processor 120 may determine that the first content exists when the first hash key is included in the selected second content, and determine that the first content does not exist when the first hash key is not included. The processor 120 may perform operation 707 when the first content exists, and perform operation 710 when the first content does not exist.

In a case where the first content does not exist, in operation 710, the processor 120 may transmit the selected second content according to the content transmission request. Alternatively, when the transmission of the first content is not requested, the processor 120 may transmit only the selected second content. The processor 120 may upload the selected second content on a web page or transmit the selected second content to a selected electronic device (e.g., the electronic device 102 of FIG. 1) of another user.

In a case where the first content exists, in operation 707, the processor 120 may identify the first content corresponding to the selected second content. The processor 120 may identify the first content by searching for the first hash key included in the selected second content from a secure area (e.g., the secure area 210 of FIG. 2) of a memory (e.g., the memory 130 of FIG. 1). When the first content is not stored in the secure area 210, the processor 120 may prepare to download the first content from the server 108 or prepare to restore the first content by using the selected second content.

In operation 709, the processor 120 may determine whether the transmission of the first content is requested. When the first content corresponding to the second content exists, the processor 120 may provide, through a display (e.g., the display module 160 of FIG. 1), a user interface including the first content and a control menu (e.g., transmit or do not transmit) for receiving a selection of whether to transmit the first content. A user may identify the first content displayed through the user interface and select whether to transmit the first content together with the second content. The processor 120 may receive a request (e.g., a selection of a transmission button) to transmit the first content corresponding to the selected second content from the user. When the processor 120 does not receive, from the user, a request to transmit the first content corresponding to the selected second content (e.g., selection of a "do not transmit" button), the processor 120 may perform operation 710. The processor 120 may perform operation 711 when the transmission of the first content is requested, and perform operation 710 when the transmission of the first content is not requested.

In a case where the transmission of the first content is requested, in operation 711, the processor 120 may transmit the selected second content and the identified first content. When the first content corresponding to the selected second content is stored in the secure area 210, the processor 120 may transmit the first content stored in the secure area 210 together with the selected second content. Alternatively, when the first content corresponding to the selected second content exists, but an access path of the server 108 is stored in the secure area 210, the processor 120 may download the first content from the server 108 to transmit the first content together with the selected second content. Alternatively, when the first content corresponding to the selected second content exists, but the first content is damaged or is not stored in the secure area 210, the processor 120 may restore the first content by using the selected second content and transmit the first content together with the selected second content.

For example, the processor 120 may restore the first content by inversely applying metadata to the selected second content. When the first content is restored, the processor 120 may newly generate a first hash key, based on the first content access information, store the generated first hash key in the secure area 210 together with the first content, and store the same first hash key in the general area 220 together with the second content. Alternatively, when the first hash key is not stored and the first content is stored in the memory 130, the processor 120 may generate the first hash key by using the first content and store the generated first hash key in the memory 130.

An operating method of an electronic device (e.g., the electronic device 101 of FIG. 1) according to various embodiments may include the operations of: acquiring a first content through a camera module (e.g., the camera module 180 of FIG. 1) of the electronic device or a communication module (e.g., the communication module 190 of FIG. 1) of the electronic device; generating a second content by editing the first content, based on a user input; and storing the acquired first content in a secure area (e.g., the secure area 210 of FIG. 2) of a memory in the electronic device, and storing the second content including metadata corresponding to the second content and first content access information corresponding to the first content in a general area (e.g., the general area 220 of FIG. 2) of the memory, wherein the first content access information associates the first content with the second content.

The operation of storing may include the operations of: generating a first hash key, based on the first content access information; and associating the generated first hash key with the first content to store the first hash key in the secure area and associating the generated first hash key with the second content to store the first hash key in the general area.

The method may further include the operations of: identifying whether the first content is stored in the secure area by using the first hash key stored in the general area; and when the first content is not stored in the secure area, restoring the first content by using the metadata included in the second content.

The method may include the operations of: when the first content is restored, storing the first content in the secure area; generating the first content access information corresponding to the first content to update the first content access information included in the second content stored in the general area; as the first content access information is updated, generating a new first hash key, based on the updated first content access information; associating the generated new first hash key with the first content to store the first hash key in the secure area; and associating the new first hash key with the second content to store the first hash key in the general area.

The method may further include the operations of: decoding the first hash key stored in the secure area to acquire an access path of a server; downloading the first content from the server and storing the first content in the secure area; and generating the first content access information corresponding to the first content and updating the first content access information included in the second content stored in the general area.

The method may further include the operations of: displaying at least one second content; determining whether the displayed second content can be edited; when the displayed second content can be edited, searching for a first content corresponding to the displayed second content; and displaying a second content obtained by applying first metadata to the first content.

The method may further include the operations of: editing the first content, based on a user input; generating a third content obtained by applying second metadata corresponding to the edit; and storing the third content including the first content access information and the second metadata corresponding to the third content in the general area.

Various embodiments of the disclosure disclosed in the specification and drawings are merely to provide a specific example to easily describe the technical contents of the disclosure and to help understanding of the disclosure, and are not intended to limit the scope of the disclosure. Therefore, the scope of the disclosure should be interpreted to include all changes or modified forms derived based on the technical spirit of the disclosure in the scope of the disclosure in addition to the embodiments described herein.

The invention claimed is:
1. An electronic device comprising:
  camera;
  communication circuitry;
  a processor operatively coupled to the camera and the communication circuitry; and
  memory storing instructions which, when executed by the processor, cause the electronic device to:
    acquire first content through the camera or the communication circuitry,
    detect a first user input for editing the first content,
    based on the first user input, generate second content by editing the first content, and
    based on the first content being edited, store the first content in a secure area of the memory and store the second content comprising metadata corresponding to the second content and first content access information corresponding to the first content in a general area of the memory,
  wherein the first content access information associates the first content with the second content, and
  wherein the secure area is configured to not allow access to the first content or selectively allow access to the first content only when obtaining user authentication through a fingerprint sensor.

2. The electronic device of claim 1, wherein the instructions which, when executed by the processor, cause the electronic device to:
  based on the first content access information, generate a first hash key,
  associate the first hash key with the first content to store the first hash key in the secure area, and
  associate the first hash key with the second content to store the first hash key in the general area.

3. The electronic device of claim 2, wherein the instructions which, when executed by the processor, cause the electronic device to:
  identify whether the first content is stored in the secure area by using the first hash key stored in the general area, and
  based on identifying that the first content is not stored in the secure area, restore the first content by using the metadata included in the second content.

4. The electronic device of claim 3, wherein the instructions which, when executed by the processor, cause the electronic device to:
  based on the restoring of the first content, store the first content in the secure area, and
  generate the first content access information corresponding to the first content to update the first content access information included in the second content stored in the general area.

5. The electronic device of claim 4, wherein the instructions which, when executed by the processor, cause the electronic device to:
  as the first content access information is updated, generate a new first hash key based on the updated first content access information,
  associate the new first hash key with the first content to store the first hash key in the secure area, and
  associate the new first hash key with the second content to store the first hash key in the general area.

6. The electronic device of claim 3, wherein the instructions which, when executed by the processor, cause the electronic device to:
  decode the first hash key stored in the secure area to acquire an access path of a server, and
  download the first content from the server.

7. The electronic device of claim 1, wherein the instructions which, when executed by the processor, cause the electronic device to:
  associate the metadata with the first content to store the metadata in the secure area, and
  based on the second content not existing in the general area or the second content being damaged, restore the second content by using the metadata and the first content.

8. The electronic device of claim 1, wherein the instructions which, when executed by the processor, cause the electronic device to:
  display at least one piece of the second content,
  determine whether the at least one piece of the second content being displayed can be edited,
  in response to determining that the at least one piece of the second content being displayed can be edited, search for the first content corresponding to the at least one piece of the second content, and
  display the second content obtained by applying first metadata to the first content.

9. The electronic device of claim 8, wherein the instructions which, when executed by the processor, cause the electronic device to:
  based on a second user input, edit the first content,
  based on the second user input editing the first content, generate third content obtained by applying second metadata corresponding to the editing, and
  store the third content comprising the first content access information and the second metadata corresponding to the third content in the general area.

10. The electronic device of claim 1, wherein the instructions which, when executed by the processor, cause the electronic device to:
  generate a second hash key by using editing engine information included in the metadata,
  store the second hash key by including the second hash key in the metadata, and
  store the editing engine information in the general area.

11. The electronic device of claim 10, wherein the instructions which, when executed by the processor, cause the electronic device to;
  in response to the second hash key included in metadata of the second content requested to be edited being different from a hash key of the editing engine information stored in the general area, disregard the request to edit the second content.

12. The electronic device of claim 1, wherein the instructions which, when executed by the processor, cause the electronic device to:
  in response to receiving a content transmission request, determine whether the first content corresponding to the second content requested to be transmitted exists, and
  in response to determining that the first content exists, transmit at least one of the second content requested to be transmitted or the first content according to a selection of a user.

13. The electronic device of claim 12, wherein the instructions which, when executed by the processor, cause the electronic device to:
  based on whether a first hash key is included in the second content requested to be transmitted, determine whether the first content corresponding to the second content requested to be transmitted exists.

14. An operating method of an electronic device, the method comprising:
acquiring first content through a camera of the electronic device or a communication circuitry of the electronic device;
detecting a user input for editing the first content;
based on the user input, generating second content by editing the first content; and
based on the first content being edited, storing the first content in a secure area of a memory of the electronic device; and storing the second content comprising metadata corresponding to the second content and first content access information corresponding to the first content in a general area of the memory,
wherein the first content access information associates the first content with the second content, and
wherein the secure area is configured to not allow access to the first content or selectively allow access to the first content only when obtaining user authentication through a fingerprint sensor.

15. The method of claim 14, further comprising:
based on the first content access information, generating a first hash key; and
associating the first hash key with the first content to store the first hash key in the secure area and associating the first hash key with the second content to store the first hash key in the general area.

16. One or more non-transitory computer-readable storage mediums storing one or more programs including instructions which, when executed by one or more processors of an electronic device, cause the electronic device to perform operations, the operations comprising:
acquiring first content through a camera of the electronic device or communication circuitry of the electronic device;
detecting a user input for editing the first content;
based on the user input, generating second content by editing the first content; and
based on the first content being edited, storing the first content in a secure area of a memory of the electronic device and storing the second content comprising metadata corresponding to the second content and first content access information corresponding to the first content in a general area of the memory,
wherein the first content access information associates the first content with the second content, and
wherein the secure area is configured to not allow access to the first content or selectively allow access to the first content only when obtaining user authentication through a fingerprint sensor.

* * * * *